United States Patent
Kim et al.

(10) Patent No.: US 11,505,034 B2
(45) Date of Patent: *Nov. 22, 2022

(54) HEAT PUMP SYSTEM FOR VEHICLE

(71) Applicants: HYUNDAI MOTOR COMPANY, Seoul (KR); KIA CORPORATION, Seoul (KR)

(72) Inventors: Jeawan Kim, Gwangmyeong-si (KR); Jae Yeon Kim, Hwaseong-si (KR); Yeonho Kim, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 21 days.

This patent is subject to a terminal disclaimer.

(21) Appl. No.: 17/339,122

(22) Filed: Jun. 4, 2021

(65) Prior Publication Data

US 2022/0088995 A1 Mar. 24, 2022

(30) Foreign Application Priority Data

Sep. 24, 2020 (KR) .......................... 10-2020-0123945

(51) Int. Cl.
*B60H 1/00* (2006.01)
*B60H 1/32* (2006.01)

(52) U.S. Cl.
CPC ..... *B60H 1/00914* (2013.01); *B60H 1/00278* (2013.01); *B60H 1/00485* (2013.01); *B60H 1/3213* (2013.01); *B60H 1/3227* (2013.01); *B60H 2001/3277* (2013.01)

(58) Field of Classification Search
CPC ............ B60H 1/00914; B60H 1/00278; B60H 1/00485; B60H 1/3213; B60H 1/3227; B60H 2001/3277
USPC ........................................................ 165/202
See application file for complete search history.

(56) References Cited

U.S. PATENT DOCUMENTS 10,661,631 B2 5/2020 Kawano
2018/0264913 A1* 9/2018 Enomoto ........... B60H 1/32284

FOREIGN PATENT DOCUMENTS

| EP | 2674695 A1 | 12/2013 |
|---|---|---|
| KR | 10-1558314 B1 | 10/2015 |
| KR | 2020-0040432 A | 4/2020 |

\* cited by examiner

*Primary Examiner* — Davis D Hwu
(74) *Attorney, Agent, or Firm* — McDonnell Boehnen Hulbert & Berghoff LLP

(57) ABSTRACT

A heat pump system for a vehicle may control a temperature of a battery module by using one chiller in which a refrigerant and a coolant are heat-exchanged, and may increase a flow rate of the refrigerant by applying a gas injection device that selectively operates in a heating or dehumidifying mode of a vehicle, thereby maximizing heating performance.

19 Claims, 5 Drawing Sheets

HEAT PUMP SYSTEM FOR VEHICLE

CROSS REFERENCE TO RELATED APPLICATIONS

This application claims priority to and the benefit of Korean Patent Application No. 10-2020-0123945 filed in the Korean Intellectual Property Office on Sep. 24, 2020, the entire contents of which are incorporated herein by reference.

BACKGROUND

(a) Field

The present disclosure relates to a heat pump system for a vehicle. More particularly, the present disclosure relates to a heat pump system for a vehicle which adjusts a temperature of a battery module by using one chiller that performs heat exchange between a refrigerant and a coolant and improves heating performance by applying a gas injection device.

(b) Description of the Related Art

In general, an air conditioner for a vehicle includes an air conditioning system for circulating a coolant in order to heat or cool an inside of the vehicle.

Such an air conditioner maintains a comfortable indoor environment by maintaining an interior temperature of the vehicle at an appropriate level regardless of an external temperature change, so that the interior of the vehicle is warmed or cooled through heat exchange by a condenser and an evaporator during a process in which a refrigerant discharged by driving of a compressor circulates back to the compressor after passing through a condenser, a receiver dryer, an expansion valve, and an evaporator.

That is, the air conditioner system condenses a gaseous coolant of a high temperature and a high pressure compressed by the compressor in a cooling mode in the summer to reduce a temperature and humidity of the interior of the vehicle through evaporation in the evaporator through the receiver dryer and the expansion valve.

Meanwhile, in recent years, as interest in energy efficiency and environmental pollution has been increasing, there has been a demand for the development of environmentally friendly vehicles configured for substantially replacing internal combustion engine vehicles. The environmentally friendly vehicles are usually fuel cell or electric vehicles driven by electricity or a hybrid vehicle driven by an engine and a battery.

Among the environmentally friendly vehicles, the electric vehicle or the hybrid vehicle does not use a separate heater, unlike an air conditioner of a general vehicle, and the air conditioner applied to the environmentally friendly vehicle is generally referred to as a heat pump system.

On the other hand, in the case of the electric vehicle, chemical reaction energy of oxygen and hydrogen is converted into electrical energy to generate driving force. In the present process, since thermal energy is generated by the chemical reaction in the fuel cell, effectively removing the generated heat is essential in securing performance of the fuel cell.

Furthermore, even in the hybrid vehicle, a motor is driven by use of the electricity supplied from the fuel cell or an electric battery together with an engine that operates by general fuel to generate the driving force, and as a result, the performance of the motor may be secured only by effectively removing the heat generated from the fuel cell or the battery and the motor.

As a result, in the hybrid vehicle or the electric vehicle generally, a battery cooling system needs to be separately formed with a separate sealing circuit together with a cooler and the heat pump system to prevent the heat generation in the motor and electrical components, and the battery including the fuel cell.

Accordingly, the size and weight of a cooling module disposed in the front of the vehicle increase and a layout of connection pipes that supply the refrigerant and the coolant to the heat pump system, the cooler, and the battery cooling system is complicated in an engine compartment.

Furthermore, the battery cooling system which heats or cools the battery according to a status of the vehicle for the battery to show optimal performance is separately provided, and as a result, multiple valves for connection with the respective connection pipes are adopted and noise and vibration due to frequent opening and closing operations of the valves are transferred to the internal of the vehicle to degrade ride comfort.

In addition, when heating the interior of the vehicle, the heating performance decreases due to a lack of a heat source, the amount of electricity consumption increases due to the use of an electric heater, and the power consumption of the compressor increases.

The above information disclosed in this Background section is only for enhancement of understanding of the background of the disclosure, and therefore it may contain information that does not form the prior art that is already known in this country to a person of ordinary skill in the art.

SUMMARY

The present disclosure has been made in an effort to provide a heat pump system for a vehicle that may simplify a system by controlling a temperature of a battery module by using one chiller in which a refrigerant and a coolant are heat-exchanged.

In addition, the present disclosure has been made in an effort to provide a heat pump system for a vehicle that may maximize heating performance by applying a gas injection device which selectively operates in a heating or dehumidifying mode of a vehicle to increase a flow rate of a refrigerant.

An embodiment of the present disclosure provides a heat pump system for a vehicle, including an air conditioner circulating a refrigerant through a refrigerant line, a coolant circulation apparatus circulating a coolant through a coolant line, a chiller that is connected to the coolant circulation apparatus through the coolant line, is connected to the refrigerant line through a refrigerant connection line, and heat-exchanges a selectively introduced coolant with a refrigerant supplied from the air conditioner to control a temperature of a coolant, and a gas injection device provided in the air conditioner and increasing a flow rate of the refrigerant circulating in the refrigerant line by bypassing some of a refrigerant passing through an internal condenser to a compressor, wherein a heat-exchanger provided in the air conditioner may be connected to the coolant circulation apparatus through the coolant line so that the coolant is supplied from the coolant circulation apparatus.

The air conditioner may include an HVAC module including an evaporator connected thereto through the refrigerant line, and an opening and closing door that controls to selectively flow an external air passing through the evaporator into the internal condenser according to cooling, heating, and dehumidifying modes of the vehicle, the heat-exchanger that heat-exchanges a refrigerant supplied through the refrigerant line with a coolant supplied from the coolant circulation apparatus, a compressor connected between the evaporator and the heat-exchanger through the refrigerant line, a sub-condenser provided in the refrigerant line the heat-exchanger and the evaporator, a first expansion valve provided in the refrigerant line connecting the sub-condenser and the evaporator, a second expansion valve provided in the refrigerant connection line; an accumulator provided in the refrigerant line between the evaporator and the compressor, a branch line having a first end connected to the refrigerant line between the heat-exchanger and the sub-condenser through a refrigerant valve and a second end connected to the accumulator, and a dehumidification line having a first end connected to the refrigerant line between the internal condenser and the heat-exchanger and a second end connected to the refrigerant line between the evaporator and the first expansion valve, and having a check valve.

A first end of the refrigerant connection line may be connected to the refrigerant line between the sub-condenser and the first expansion valve, and a second end of the refrigerant connection line may be connected to the refrigerant line between the accumulator and the evaporator.

The second expansion valve may selectively expand the refrigerant that has passed through the sub-condenser according to a mode of the vehicle to introduce the refrigerant into the refrigerant connection line.

The gas injection device may include a gas-liquid separator provided in the refrigerant line between the internal condenser and the heat-exchanger, and separating and selectively discharging a gaseous refrigerant and a liquid refrigerant among the refrigerant that have passed through the internal condenser, a supply line connecting the gas-liquid separator and the compressor, and selectively supplying the gaseous refrigerant from the gas-liquid separator to the compressor, a control valve provided in the supply line, a third expansion valve provided in the refrigerant line between the internal condenser and the gas-liquid separator, and a fourth expansion valve provided in the refrigerant line between the gas-liquid separator and the heat-exchanger.

When the gas injection device is operated in a heating mode of the vehicle, the third expansion valve may expand the refrigerant supplied from the internal condenser to supply the refrigerant to the gas-liquid separator; and the fourth expansion valve may expand the refrigerant supplied from the gas-liquid separator to supply it to the heat-exchanger.

When the gas injection device is not operated in a heating mode of the vehicle, the third expansion valve may pass the refrigerant supplied from the internal condenser, and the fourth expansion valve may expand the refrigerant that has passed through the gas-liquid separator to supply the refrigerant to the heat-exchanger.

When the gas injection device is not operated in a dehumidifying mode of the vehicle, the third expansion valve may pass the refrigerant supplied from the internal condenser, and the fourth expansion valve may expand the refrigerant that has passed through the gas-liquid separator to supply the refrigerant to the heat-exchanger.

When the gas injection device is operated in a dehumidifying mode of the vehicle, the third expansion valve may expand the refrigerant supplied from the internal condenser to supply the refrigerant to the gas-liquid separator, and the fourth expansion valve may expand the refrigerant supplied from the gas-liquid separator to supply the refrigerant to the heat-exchanger.

In a cooling mode of the vehicle, the third and fourth expansion valves may not expand the refrigerant supplied from the internal condenser, but may flow the refrigerant through the refrigerant line.

The control valve, when the gas injection device is operated, may operate so that the supply line may be opened.

The second, third, and fourth expansion valves may be electronic expansion valves that selectively expand the refrigerant while controlling flowing of the refrigerant.

The heat-exchanger may additionally condense or evaporate the refrigerant discharged from the gas-liquid separator through heat-exchange with the coolant, according to a selective operation of the fourth expansion valve.

When a battery module is cooled in a cooling mode of the vehicle, the coolant circulation apparatus may supply the coolant to the heat-exchanger and the chiller through the coolant line connected to the heat-exchanger and the chiller, in the air conditioner, the refrigerant connection line may be opened by the second expansion valve, the refrigerant may be circulated along the refrigerant line and the refrigerant connection line, the first and second expansion valves may expand the refrigerant so that an expanded refrigerant is supplied to the evaporator and the chiller, respectively, the branch line may be closed by the refrigerant valve, the refrigerant line connecting the heat-exchanger and the sub-condenser may be opened by the refrigerant valve, the heat-exchanger may condense the refrigerant through heat-exchange with the coolant, and the sub-condenser may further condense the refrigerant through heat-exchange with external air.

In a heating mode of the vehicle, the coolant circulation apparatus may supply the coolant to the heat-exchanger through the coolant line connected to the heat-exchanger, in the air conditioner, the refrigerant line connecting the sub-condenser and the evaporator may be closed by the first expansion valve, the refrigerant connection line may be closed by of the second expansion valve, the fourth expansion valve may expand the refrigerant, the branch line may be opened by the refrigerant valve, the refrigerant line connecting the heat-exchanger and the sub-condenser may be closed by the refrigerant valve, the heat-exchanger may evaporate the refrigerant through heat-exchange with the coolant, and the gas injection device may be selectively operated.

In a dehumidifying mode of the vehicle, the coolant circulation apparatus may supply the coolant to the heat-exchanger through the coolant line connected to the heat-exchanger, in the air conditioner, the refrigerant line connecting the sub-condenser and the evaporator may be closed by the first expansion valve, the refrigerant connection line may be closed by the second expansion valve, the branch line is opened by the refrigerant valve, the refrigerant line connecting the heat-exchanger and the sub-condenser may be closed by the refrigerant valve, the heat-exchanger may evaporate the refrigerant through heat-exchange with the coolant, the fourth expansion valve may expand the refrigerant, the dehumidification line may be opened by the check valve so that the refrigerant expanded by the fourth expansion is supplied to the evaporator, and the gas injection device may be selectively operated.

The gas injection device may include a plate-shaped heat-exchanger provided in the refrigerant line between the heat-exchanger and the sub-condenser, a supply line that includes a first end connected to the refrigerant line between the heat-exchanger and the plate-shaped heat-exchanger and a second end connected to the compressor through the plate-shaped heat-exchanger, a third expansion valve provided in the supply line at a front end of the plate-shaped heat-exchanger, and a fourth expansion valve provided in the refrigerant line between the plate-shaped heat-exchanger and the sub-condenser.

The heat-exchanger may be a water-cooled heat-exchanger, and the sub-condenser may be an air-cooled heat-exchanger.

The gas injection device may selectively operate in a heating or dehumidifying mode of the vehicle.

As described above, according to the heat pump system for the vehicle according to the embodiment of the present disclosure, simplification of the system may be realized, by using one chiller in which a refrigerant and a coolant are heat-exchanged to control a temperature of a battery module according to a vehicle mode.

In addition, according to the embodiment of the present disclosure, by efficiently controlling a temperature of a battery module, it is possible to operate the battery module at optimal performance, and a total mileage of the vehicle may be increased through efficient management of the battery module.

In addition, according to the embodiment of the present disclosure, it is possible to maximize heating performance by selectively increasing a flow rate of refrigerant in a heating or dehumidifying mode of a vehicle by applying a gas injection device.

Furthermore, according to the embodiment of the present disclosure, it is possible to reduce manufacturing cost and weight through simplification of an entire system, and to improve space utilization.

DETAILED DESCRIPTION

Figure 1:
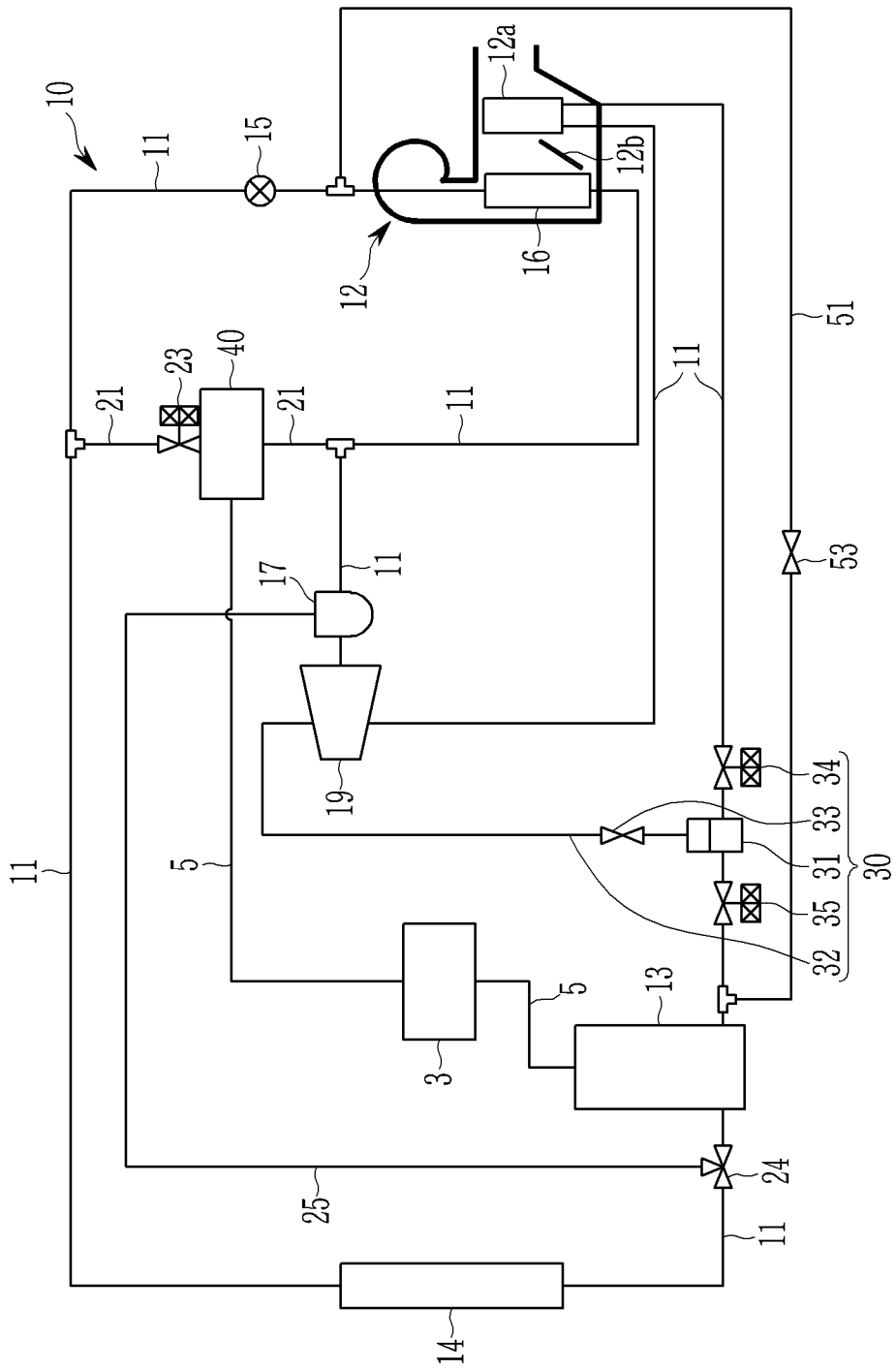
FIG. 1 illustrates a block diagram of a heat pump system for a vehicle according to an exemplary embodiment of the present disclosure.

An exemplary embodiment of the present disclosure will hereinafter be described in detail with reference to the accompanying drawings.

Exemplary embodiments described in the present specification and configurations shown in the drawings are just the most preferable exemplary embodiments of the present disclosure, but do not limit the spirit and scope of the present disclosure. Therefore, it should be understood that there may be various equivalents and modifications capable of replacing them at the time of filing of the present application.

In order to clarify the present disclosure, parts that are not connected with the description will be omitted, and the same elements or equivalents are referred to by the same reference numerals throughout the specification.

The size and thickness of each element are arbitrarily shown in the drawings, but the present disclosure is not necessarily limited thereto, and in the drawings, the thickness of layers, films, panels, regions, etc., are exaggerated for clarity.

Throughout this specification and the claims which follow, unless explicitly described to the contrary, the word "comprise" or variations such as "comprises" or "comprising" will be understood to imply the inclusion of stated elements but not the exclusion of any other elements.

Further, the terms, " . . . unit", " . . . mechanism", " . . . portion", " . . . member", etc. used herein mean a unit of inclusive components performing at least one or more functions or operations.

FIG. 1 is a block diagram of a heat pump system for a vehicle according to an exemplary embodiment of the present disclosure.

A heat pump system for a vehicle according to an embodiment of the present disclosure may control a temperature of a battery module (not shown) by using a chiller 40 in which a refrigerant and a coolant are heat-exchanged, and may improve heating performance by applying a gas injection device 30.

Here, in the heat pump system, a coolant circulation apparatus 3 that supplies a coolant to the electrical components and the battery module in an electric vehicle, and an air conditioner 10 for cooling and heating an interior of the vehicle, may be mutually interconnected.

That is, referring to FIG. 1, the heat pump system may include the coolant circulation apparatus 3, the air conditioner 10, and the chiller 40.

First, the coolant circulation apparatus 3 circulates a coolant through a coolant line 5. The coolant circulation apparatus 3 may be connected to the electrical components and the battery module, which are not shown, through the coolant line 5.

In addition, the coolant circulation apparatus 3 may include a radiator, a water pump, and a reservoir tank, which are not shown.

The electrical components (not shown) may include a power conversion device such as an electric power control unit (EPCU), a motor, an inverter, and an onboard charger (OBC), and an autonomous driving controller.

The electrical components as described above may be connected to the coolant line 5 to be cooled by water cooling.

The coolant circulation apparatus 3 circulates the coolant cooled by the radiator along the coolant line 5 through an operation of a water pump, thereby cooling the electrical components (not shown) or the battery module (not shown) to not overheat.

In the present embodiment, the air conditioner 10 includes an HVAC (heating, ventilation, and air conditioning) module 12, a heat-exchanger 13, a sub-condenser 14, a first expansion valve 15, an evaporator 16, and an accumulator 17, a compressor 19, a refrigerant connection line 21, a second expansion valve 23, a branch line 25, and a dehumidification line 51, which are connected through a refrigerant line 11.

First, the HVAC module 12 includes the evaporator 16 connected thereto through the refrigerant line 11, and an opening and closing door 12*b* for controlling the external air passing through the evaporator 16 to selectively flow into an internal condenser 12*a* according to the cooling, heating, and dehumidifying modes of the vehicle.

That is, the opening and closing door 12b is opened so that the external air that has passed through the evaporator 16 flows into the internal condenser 12a in the heating mode of the vehicle.

In contrast, in the cooling mode of the vehicle, the opening and closing door 12b closes the internal condenser 12a side so that the external air cooled while passing through the evaporator 16 directly flows into the vehicle.

The internal condenser 12a may condense the refrigerant supplied from the compressor 19 by heat-exchanging with the external air.

In the present embodiment, the heat-exchanger 13 is connected to the refrigerant line 11 so that the refrigerant passes therethrough. The heat-exchanger 13 may be connected to the coolant circulation apparatus 3 through the coolant line 5 so that the coolant is supplied from the coolant circulation apparatus 3.

That is, the heat-exchanger 13 may condense or evaporate the refrigerant through the heat-exchange with the coolant supplied through the coolant line 5. The heat-exchanger 13 may be a water-cooled heat-exchanger into which a coolant flow.

In the present exemplary embodiment, the sub-condenser 14 may be provided in the refrigerant line 11 between the heat-exchanger 13 and the evaporator 16.

The first expansion valve 15 is provided in the refrigerant line 11 between the sub-condenser 14 and the evaporator 16. The first expansion valve 15 receives the refrigerant passed through the sub-condenser 14 to expand it.

The accumulator 17 is provided in the refrigerant line 11 between the evaporator 16 and the compressor 19.

The accumulator 17 improves efficiency and durability of the compressor 19 by supplying only the gaseous refrigerant to the compressor 19.

The compressor 19 is connected between the evaporator 16 and the heat-exchanger 13 through the refrigerant line 11. The compressor 19 may compress the gaseous refrigerant, and may supply the compressed refrigerant to the internal condenser 12a.

In the present embodiment, a first end of the refrigerant connection line 21 is connected to the refrigerant line 11 between the sub-condenser 14 and the first expansion valve 15. In addition, a second end of the refrigerant connection line 21 may be connected to the refrigerant line 11 between the evaporator 16 and the accumulator 17.

Meanwhile, the second expansion valve 23 may be provided in the refrigerant connection line 21.

The second expansion valve 23 may selectively expand the refrigerant that has passed through the sub-condenser 14 according to a mode of the vehicle to flow it into the refrigerant connection line 21, or pass the refrigerant through the refrigerant connection line 21.

When the battery module (not shown) is cooled by using the coolant heat-exchanged with the refrigerant, the second expansion valve 23 expands the refrigerant introduced through the refrigerant connection line 21 to flow the refrigerant into the chiller 40.

That is, the second expansion valve 23 expands the refrigerant discharged from the sub-condenser 14 to lower the temperature thereof and flows it into the chiller 40, so that a temperature of the coolant passing through the inside of the chiller 40 may be further reduced.

Accordingly, the coolant whose water temperature is lowered while passing through the chiller 40 may flow into and cool the battery module (not shown).

In the present exemplary embodiment, a first end of the branch line 25 is connected to the refrigerant line 11 between the heat-exchanger 13 and the sub-condenser 14 through a refrigerant valve 24. In addition, a second end of the branch line 25 may be connected to the accumulator 17.

The branch line 25 may be opened through an operation of the refrigerant valve 24 in the heating mode or the dehumidifying mode of the vehicle. In this case, the refrigerant valve 24 may close the refrigerant line 11 connected to the sub-condenser 14.

In the present exemplary embodiment, a first end of the dehumidification line 51 is connected to the refrigerant line 11 between the internal condenser 12a and the heat-exchanger 13.

A second end of the dehumidification line 51 is connected to the refrigerant line 11 between the evaporator 16 and the first expansion valve 15. Herein, a check valve 53 may be provided in the dehumidification line 51.

That is, the dehumidification line 51 may be opened through an operation of check valve 53 in the dehumidifying mode of the vehicle.

In addition, the compressor 19 is connected between the evaporator 16 and the heat-exchanger 13 through the refrigerant line 11. The compressor 19 may compress the gaseous refrigerant, and may supply the compressed refrigerant to the internal condenser 12a.

Meanwhile, in the present embodiment, the heat pump system may further include a gas injection device 30.

The gas injection device 30 is provided in the air conditioner 10.

The gas injection device 30 may bypass some of the refrigerant that has passed through the internal condenser 12a to the compressor 19 to increase the flow rate of the refrigerant circulating in the refrigerant line 11.

The gas injection device 30 configured as described above may be selectively operated in the heating or dehumidifying mode of the vehicle.

Conversely, the gas injection device 30 may be stopped in the cooling mode of the vehicle.

Here, the gas injection device 30 includes a gas-liquid separator 31, a supply line 32, a control valve 33, a third expansion valve 34, and a fourth expansion valve 35.

First, the gas-liquid separator 31 is provided in the refrigerant line 11 between the internal condenser 12a and the heat-exchanger 13.

The gas-liquid separator 31 may separate gaseous refrigerant and liquid refrigerant of the refrigerant completely heat-exchanged while passing through the internal condenser 12a to selectively discharge them.

The supply line 32 connects the gas-liquid separator 31 and the compressor 19. The supply line 32 may selectively supply the gaseous refrigerant from the gas-liquid separator 31 to the compressor 19.

That is, the supply line 32 may connect the gas-liquid separator 31 and the compressor 19 so that the gaseous refrigerant that has passed through the gas-liquid separator 31 may selectively flow into the compressor 19.

In the present embodiment, the control valve 33 is provided in the supply line 32. The control valve 33 may selectively open the supply line 32 according to the vehicle mode.

That is, the control valve 33 may be operated so that the supply line 32 may be opened when the gas injection device 30 is operated.

Here, the gas-liquid separator 31 may supply the gaseous refrigerant to the compressor 19 through the supply line 32 opened by the operation of the control valve 33. In addition, the gas-liquid separator 31 may supply a liquid refrigerant to the heat-exchanger 13.

The third expansion valve 34 is provided in the refrigerant line 11 between the internal condenser 12a and the gas-liquid separator 31.

In addition, the fourth expansion valve 35 may be provided in the refrigerant line 11 between the gas-liquid separator 31 and the heat-exchanger 13.

That is, when the gas injection device 30 is operated in the heating mode of the vehicle, the third expansion valve 34 may expand the refrigerant supplied from the internal condenser 12a to supply it to the gas-liquid separator 31.

In addition, the fourth expansion valve 35 may expand the refrigerant supplied from the gas-liquid separator 31 to flow into the refrigerant line 11.

Conversely, when the gas injection device 30 is not operated in the heating mode of the vehicle, the third expansion valve 34 may pass the refrigerant supplied from the internal condenser 12a.

In addition, the fourth expansion valve 35 may expand the refrigerant passed through the gas-liquid separator 31 to supply it to the heat-exchanger 13.

Meanwhile, when the gas injection device 30 is operated in the dehumidifying mode of the vehicle, the third expansion valve 34 may expand the refrigerant supplied from the internal condenser 12a to supply it to the gas-liquid separator 31.

In addition, the fourth expansion valve 35 may expand the refrigerant passed through the gas-liquid separator 31 to supply it to the heat-exchanger 13.

Conversely, when the gas injection device 30 is not operated in the dehumidifying mode of the vehicle, the third expansion valve 34 may pass the refrigerant supplied from the internal condenser 12a.

In addition, the fourth expansion valve 35 may expand the refrigerant passed through the gas-liquid separator 31 to supply it to the heat-exchanger 13.

In addition, in the cooling mode of the vehicle, the third and fourth expansion valves 34 and 35 may not expand the refrigerant supplied from the internal condenser 12a but flow it through the refrigerant line 11.

Herein, the heat-exchanger 13 may selectively condense or evaporate the refrigerant that has passed through the internal condenser 12a according to whether the gas injection device 30 is operated.

Specifically, the heat-exchanger 13 additionally condenses or evaporates the refrigerant discharged from the gas-liquid separator 31 through heat-exchange with the coolant according to the selective operation of the fourth expansion valve 35.

When the heat-exchanger 13 condenses the refrigerant, the heat-exchanger 13 further condenses the refrigerant condensed in the internal condenser 12a, and the sub-condenser further condenses the refrigerant, so that it may increase sub-cooling of the refrigerant, thus a coefficient of performance (COP), which is a coefficient of cooling capacity to required power of a compressor, may be improved.

Meanwhile, the gas injection device 30 may further include a separate connection line (not shown) that has a first end connected to the refrigerant line 11 between the internal condenser 12a and the third expansion valve 34, and a second end connected to the refrigerant line 11 between the fourth expansion valve 35 and the heat-exchanger 13.

A separate on-off valve (not shown) may be provided in the separate connection line (not shown).

That is, in the cooling mode of the vehicle, the connection line (not shown) is opened through the operation of the on-off valve, and in this case, the refrigerant that has passed through the internal condenser 12a may be directly supplied to the heat-exchanger 13 without passing through the gas injection device 30.

Accordingly, cooling performance may be improved by reducing the pressure of the refrigerant circulating along the refrigerant line 11 in the cooling mode of the vehicle.

In the present embodiment, the chiller 40 is connected to the coolant circulation apparatus 3 through the coolant line 5, and the coolant may be selectively circulated therein.

The chiller 40 is connected to the refrigerant line 11 through the refrigerant connection line 21. That is, the chiller 40 may be a water-cooled heat-exchanger into which a coolant flow.

Accordingly, the chiller 40 heat-exchanges the coolant selectively flowing through the coolant line 5 with the refrigerant selectively supplied from the air conditioner 10 to control the temperature of the coolant.

In the present exemplary embodiment, the first expansion valve 15 may be a mechanical expansion valve, and the second, third, and fourth expansion valves 23, 34, and 35 that selectively expand the refrigerant while controlling the flow of the refrigerant passing through the refrigerant line 11 or the refrigerant connection line 21.

Meanwhile, a gas injection device 130 according to another embodiment of the present disclosure will be described with reference to FIG. 2.

Figure 2:
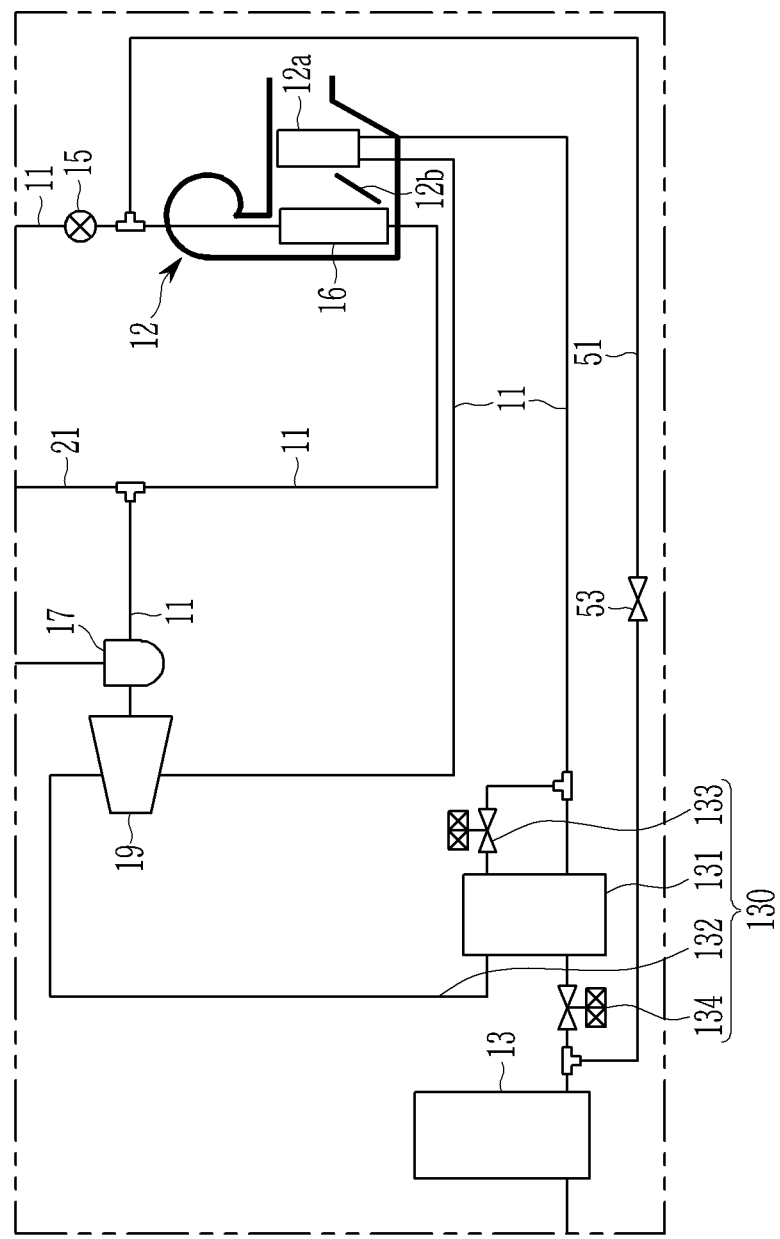
FIG. 2 illustrates a block diagram of a gas injection device applied to a heat pump system for a vehicle according to another embodiment of the present disclosure.

FIG. 2 illustrates a block diagram of a gas injection device applied to a heat pump system for a vehicle according to another embodiment of the present disclosure.

Referring to FIG. 2, the gas injection device 130 according to another embodiment of the present disclosure is provided in the air conditioner 10.

Herein, the gas injection device 130 may include a plate-shaped heat-exchanger 131, a supply line 132, a third expansion valve 133, and a fourth expansion valve 134.

First, the plate-shaped heat-exchanger 131 may be provided in the refrigerant line 11 between the internal condenser 12a and the heat-exchanger 13.

A first end of the supply line 132 is connected to the refrigerant line 11 between the internal condenser 12a and the plate-shaped heat-exchanger 131.

A second end of the supply line 132 may be connected to the compressor 19 through the plate-shaped heat-exchanger 131.

That is, some of the refrigerant that has passed through the internal condenser 12a may flow into the supply line 132 and the remaining refrigerant thereof may flow into the plate-shaped heat-exchanger 131 through the refrigerant line 11.

The third expansion valve 133 may be provided in the supply line 132 at a front end of the plate-shaped heat-exchanger 131.

The third expansion valve 133 may selectively open and close the supply line 132 according to whether the gas injection device 130 is operated, and at the same time, expand the refrigerant flowing into the supply line 132.

In addition, the fourth expansion valve 134 may be provided in the refrigerant line 11 between the plate-shaped heat-exchanger 131 and the heat-exchanger 13.

Herein, the third expansion valve 133 may expand the refrigerant flowing into the supply line 132 through the internal condenser 12a in the heating or dehumidifying mode of the vehicle to supply it to the plate-shaped heat-exchanger 131.

Accordingly, the plate heat-exchanger 131 may heat-exchange the refrigerant flowing into the supply line 132 and expanded through the operation of the third expansion valve 133 with the refrigerant discharged from the internal condenser 12a.

Then, the supply line 132 may selectively supply a gaseous refrigerant among the refrigerant heat-exchanged while passing through the plate-shaped heat-exchanger 131 to the compressor 19.

The operation of the gas injection device 130 configured as described above is as follows.

First, some of the refrigerant that has passed through the internal condenser 12a flows into the supply line 132 according to the operation of the third expansion valve 133.

The refrigerant flowing into the supply line 132 is expanded through the operation of the third expansion valve 133, and the expanded refrigerant enters a gaseous state while being heat-exchanged with the remaining refrigerant introducing through the refrigerant line 11 from the internal condenser 12a, inside the plate-shaped heat-exchanger 131.

The gaseous refrigerant is supplied to the compressor 19 through the opened supply line 132.

That is, the gas injection device 130 flows the gaseous refrigerant heat-exchanged while passing through the plate-shaped heat-exchanger 131 back into the compressor 19 through the supply line 132, thereby increasing the flow rate of the refrigerant circulating in the refrigerant line 11.

On the other hand, the fourth expansion valve 134 may expand the refrigerant passing through the plate-shaped heat-exchanger 131 to flow it into the refrigerant line 11, regardless of whether the gas injection device 30 is operated in the heating or dehumidifying mode of the vehicle.

In addition, in the cooling mode of the vehicle, the fourth expansion valve 134 may introduce the refrigerant supplied from the internal condenser 12a to the refrigerant line 11 without expanding it.

Hereinafter, an operation and action of the heat pump system for the vehicle according to the embodiment of the present disclosure configured as described above will be described in detail with reference to FIG. 3 to FIG. 5.

First, an operation for cooling a battery module (not shown) in the vehicle cooling mode will be described with reference to FIG. 3.

Figure 3:
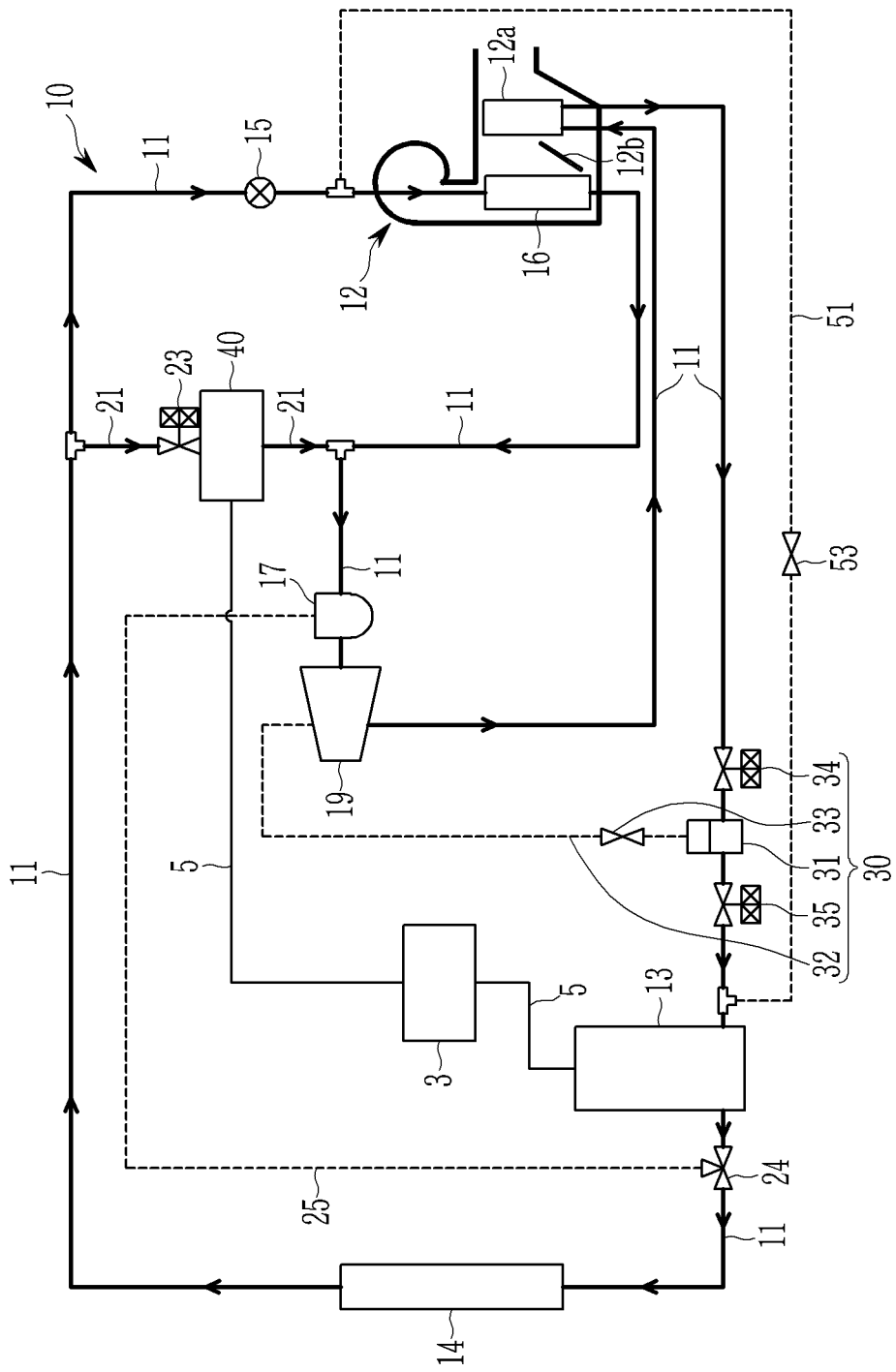
FIG. 3 illustrates an operational state diagram for cooling a battery module by using a refrigerant in a cooling mode of a vehicle in a heat pump system for a vehicle according to an embodiment of the present disclosure.

FIG. 3 illustrates an operational state diagram of cooling a battery module by using a refrigerant in a vehicle cooling mode in a heat pump system for a vehicle according to an embodiment of the present disclosure.

Referring to FIG. 3, the coolant circulation apparatus 3 supplies the coolant to the heat-exchanger 13 and the chiller 40 through the coolant line 5 connected to the heat-exchanger 13 and the chiller 40.

In the air conditioner 10, respective constituent elements thereof operate to cool the interior of the vehicle. Accordingly, the refrigerant is circulated along the refrigerant line 11.

Herein, the refrigerant line 11 connecting the sub-condenser 14 and the evaporator 16 is opened through the operation of the first expansion valve 15. The refrigerant connection line 21 is opened through the operation of the second expansion valve 23.

Then, the refrigerant that has passed through the sub-condenser 14 may be circulated along the refrigerant line 11 and the refrigerant connection line 21.

Herein, the first and second expansion valves 15 and 23 may expand the refrigerant so that the expanded refrigerant may be supplied to the evaporator 16 and the chiller 40, respectively.

In addition, the sub-condenser 14 may further condense the refrigerant introduced from the heat-exchanger 13 through heat-exchange with the external air.

Meanwhile, the coolant passing through the chiller 40 may cool the battery module connected to the coolant circulation apparatus 3.

That is, the coolant passing through the chiller 40 is cooled through heat-exchange with refrigerant supplied to the first chiller 40. The coolant cooled by the chiller 40 is supplied to the battery module. Accordingly, the battery module may be efficiently cooled by the cooled coolant.

That is, the second expansion valve 23 expands some of the refrigerant that has passed through the sub-condenser 14 so that the expanded refrigerant is supplied to the chiller 40.

Therefore, some of the refrigerant discharged from the sub-condenser 14 is expanded through the operation of the second expansion valve 23 to enter a low-temperature and low-pressure state, and introduces into the chiller 40 provided in the refrigerant connection line 21.

Then, the refrigerant introducing into the chiller 40 is heat-exchanged with the coolant, passes through the accumulator 17 through the refrigerant line 11 connected to the refrigerant connection line 21, and then is introduced into the compressor 19.

Meanwhile, the remaining refrigerant discharged from the sub-condenser 14 introduces through the refrigerant line 11 to cool the interior of the vehicle, and sequentially passes through the first expansion valve 15, the evaporator 16, the accumulator 17, the compressor 19, the internal condenser 12a, and the heat-exchanger 13.

Herein, the external air flowing into the HVAC module 12 is cooled while passing through the evaporator 16 by the low-temperature refrigerant introducing into the evaporator 16.

In this case, the opening and closing door 12b closes parts passing through the internal condenser 12a so that cooled outside air does not pass through the internal condenser 12a. Accordingly, the cooled external air directly introduces into the interior of the vehicle, thereby cooling the interior of the vehicle.

Meanwhile, the refrigerant with a condensation amount that is increased while sequentially passing through the heat-exchanger 13 and the sub-condenser 14 is expanded and supplied to the evaporator 16, so that the refrigerant may be evaporated at a lower temperature.

That is, in the present embodiment, the heat-exchanger 13 condenses the refrigerant through heat-exchanging with the coolant and the sub-condenser 14 additionally condenses the refrigerant through heat-exchanging with the external air, thereby advantageously performing sub-cooling of the refrigerant.

In addition, as the refrigerant in which the sub-cooling is performed is evaporated at a lower temperature in the evaporator 16, the temperature of the external air passing through the evaporator 16 may be further lowered, thereby improving cooling performance and efficiency.

Meanwhile, the gas injection device 30 is not operated. Herein, the refrigerant discharged from the internal condenser 12a may be supplied to the heat-exchanger 13 without expansion in the third and fourth expansion valves 34 and 35.

While repeating the above-described process, the refrigerant may cool the interior in the cooling mode of the vehicle, and at the same time, it may cool the coolant through heat-exchange while passing through the chiller 40.

The low-temperature coolant cooled in the chiller 40 is introduced into the battery module. Accordingly, the battery module may be efficiently cooled by the supplied low-temperature coolant.

In the present embodiment, an operation for a heating mode of a vehicle will be described with reference to FIG. 4.

Figure 4:
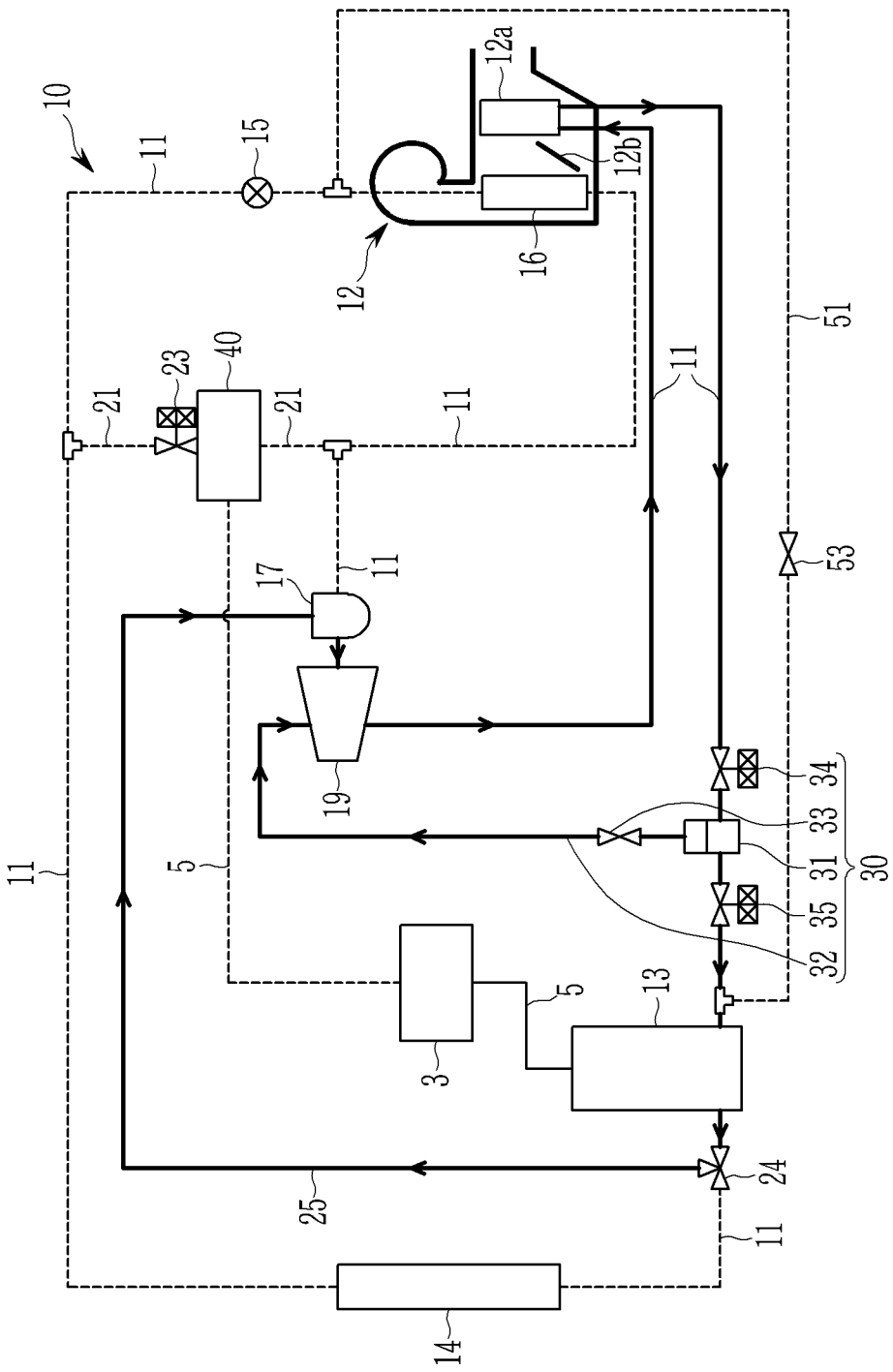
FIG. 4 illustrates an operational state diagram of a heating mode in a heat pump system for a vehicle according to an embodiment of the present disclosure.

FIG. 4 illustrates an operational state diagram of a heating mode in a heat pump system for a vehicle according to an embodiment of the present disclosure.

Referring to FIG. 4, the coolant circulation apparatus 3 supplies the coolant to the heat-exchanger 13 through the coolant line 5 connected to the heat-exchanger 13.

In the air conditioner 10, respective constituent elements thereof operate to heat the interior of the vehicle. Accordingly, the refrigerant is circulated along the refrigerant line 11.

Herein, the refrigerant line 11 connecting the sub-condenser 14 and the evaporator 16 is closed by the first expansion valve 15.

The refrigerant connection line 21 is closed by the second expansion valve 23.

At the same time, the branch line 25 is opened by the refrigerant valve 24.

In addition, the refrigerant line 11 connecting the heat-exchanger 13 and the sub-condenser 14 is closed by the refrigerant valve 24.

Meanwhile, the fourth expansion valve 35 may expand the refrigerant passed through the gas-liquid separator 31 to supply it to the heat-exchanger 13.

Accordingly, the heat-exchanger 13 may evaporate the expanded refrigerant through heat-exchanging with the coolant.

The refrigerant evaporated in the heat-exchanger 13 is supplied to the accumulator 17 along the branch line 25.

The refrigerant supplied to the accumulator 17 is separated into gas and liquid. The gaseous refrigerant of the refrigerant separated into gas and liquid is supplied to the compressor 19.

The refrigerant compressed at a high temperature and high pressure in the compressor 19 flows into the internal condenser 12a.

Herein, the refrigerant supplied to the internal condenser 12a may increase the temperature of the external air introducing into the HVAC module 12.

The opening and closing door 12b is opened so that the external air that introduces into the HVAC module 12 and then passes through the evaporator 16 passes through the internal condenser 12a.

As a result, the external air introducing from the outside flows into the room temperature state in which it is not cooled when passing through the evaporator 16 to which no refrigerant is supplied. The introduced external air is converted to a high temperature state while passing through the internal condenser 12a to introduce into the interior of the vehicle, so that the interior of the vehicle may be heated.

Herein, when the gas injection device 30 is operated, the supply line 32 is opened through the operation of the control valve 33.

In this state, the third expansion valve 34 expands the refrigerant supplied from the internal condenser 12a to supply it to the gas-liquid separator 31.

Among the refrigerant supplied to the gas-liquid separator 31, the gaseous refrigerant is supplied to the compressor 19 through the opened supply line 32.

That is, the gas injection device 30 flows the gaseous refrigerant heat-exchanged while passing through the gas-liquid separator 31 back into the compressor 19 through the supply line 32, thereby increasing the flow rate of the refrigerant circulating in the refrigerant line 11.

In addition, the liquid refrigerant discharged from the gas-liquid separator 31 through the refrigerant line 11 flows into the heat-exchanger 13 along the refrigerant line 11 opened through the operation of the fourth expansion valve 35.

In this case, the fourth expansion valve 35 may expand the refrigerant supplied from the gas-liquid separator 31.

That is, the gas-liquid separator 31 of the gas injection device 30 may bypass the gaseous refrigerant to the compressor 19 through the supply line 32, and may supply the liquid refrigerant to the fourth expansion valve 35.

Then, the refrigerant may be expanded while passing through the fourth expansion valve 35, and may be evaporated through heat-exchange with the external air in the heat-exchanger 13.

Accordingly, the present disclosure may improve heating efficiency and performance while minimizing a use amount of a separate electric heater.

Furthermore, the gas injection device 30 may maximize the heating performance by increasing the flow rate of the refrigerant circulating in the refrigerant line 11.

In the present embodiment, an operation for a dehumidifying mode of a vehicle will be described with reference to FIG. 5.

Figure 5:
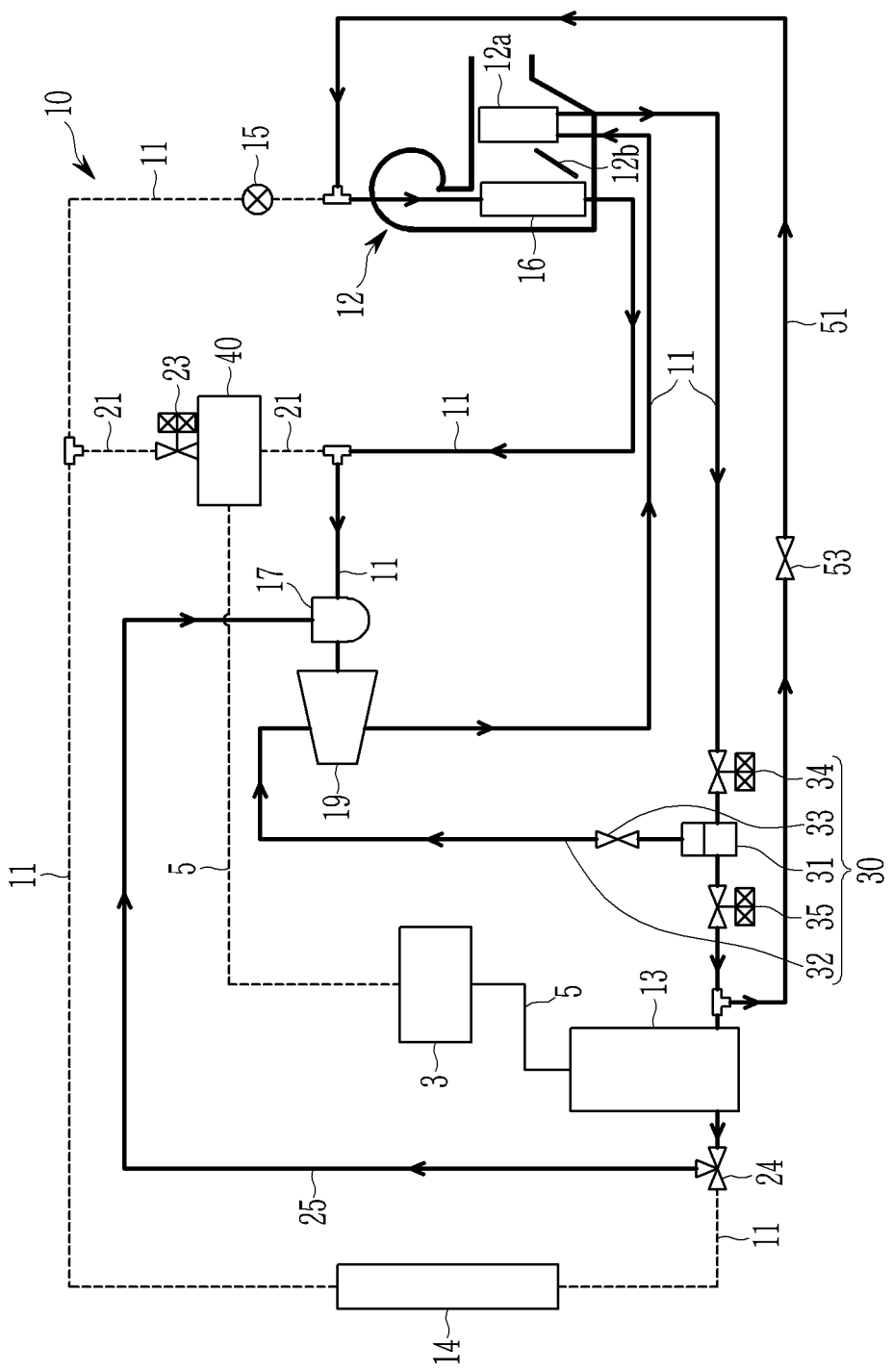
FIG. 5 illustrates an operational state diagram of a dehumidifying mode in a heat pump system for a vehicle according to an embodiment of the present disclosure.

FIG. 5 illustrates an operational state diagram of a dehumidifying mode in a heat pump system for a vehicle according to an embodiment of the present disclosure.

Referring to FIG. 5, the heat pump system may perform the dehumidifying mode while heating the interior of the vehicle.

First, the coolant circulation apparatus 3 supplies the coolant to the heat-exchanger 13 through the coolant line 5 connected to the heat-exchanger 13.

In the air conditioner 10, respective constituent elements thereof operate to heat and dehumidify the interior of the vehicle. Accordingly, the refrigerant is circulated along the refrigerant line 11.

Herein, the refrigerant line 11 connecting the sub-condenser 14 and the evaporator 16 is closed by the first expansion valve 15.

The refrigerant connection line 21 is closed by the second expansion valve 23.

At the same time, the branch line 25 is opened by the refrigerant valve 24.

In addition, the refrigerant line 11 connecting the heat-exchanger 13 and the sub-condenser 14 is closed by the refrigerant valve 24.

Meanwhile, the fourth expansion valve 35 may expand the refrigerant passed through the gas-liquid separator 31 to supply it to the heat-exchanger 13.

Accordingly, the heat-exchanger 13 may evaporate the expanded refrigerant through heat-exchanging with the coolant.

Herein, the dehumidification line 51 is opened by the check valve 53 so that the refrigerant expanded through the operation of the fourth expansion valve 35 is supplied to the evaporator 16.

Accordingly, some of the refrigerant expanded in the fourth expansion valve 35 may be introduced into the evaporator 16 through the opened dehumidification line 51.

Thereafter, the refrigerant evaporated in the heat-exchanger 13 is supplied to the accumulator 17 along the branch line 25.

The refrigerant supplied to the accumulator 17 is separated into gas and liquid. The gaseous refrigerant of the refrigerant separated into gas and liquid is supplied to the compressor 19.

The refrigerant compressed at a high temperature and high pressure in the compressor 19 flows into the internal condenser 12a.

Herein, the refrigerant supplied to the internal condenser 12a may increase the temperature of the external air introducing into the HVAC module 12.

The opening and closing door 12b is opened so that the external air that introduces into the HVAC module 12 and then passes through the evaporator 16 passes through the internal condenser 12a.

That is, the external air introducing into the HVAC module 12 is dehumidified while passing through the evaporator 16 by the low-temperature refrigerant introducing into the evaporator 16. Then, while passing through the internal condenser 12a, it is converted into a high temperature state to introduce into the interior of the vehicle, thereby heating and dehumidifying the interior of the vehicle.

Meanwhile, the gas injection device 30 may be selectively operated in the dehumidifying mode of the vehicle.

First, when the gas injection device 30 does not operate, the third expansion valve 34 passes the refrigerant supplied from the internal condenser 12a. The fourth expansion valve 35 expands the refrigerant passing through the gas-liquid separator 31 to supply it to the heat-exchanger 13.

Accordingly, the heat-exchanger 13 may evaporate the refrigerant through heat-exchange with the coolant.

On the contrary, when the gas injection device 30 is operated, the supply line 32 is opened through the operation of the control valve 33.

In this state, the third expansion valve 34 expands the refrigerant supplied from the internal condenser 12a to supply it to the gas-liquid separator 31.

Among the refrigerant supplied to the gas-liquid separator 31, the gaseous refrigerant is supplied to the compressor 19 through the opened supply line 32.

That is, the gas injection device 30 flows the gaseous refrigerant heat-exchanged while passing through the gas-liquid separator 31 back into the compressor 19 through the supply line 32, thereby increasing the flow rate of the refrigerant circulating in the refrigerant line 11.

In addition, the liquid refrigerant discharged from the gas-liquid separator 31 through the refrigerant line 11 flows into the heat-exchanger 13 along the refrigerant line 11 opened by the fourth expansion valve 35.

The fourth expansion valve 35 expands the refrigerant that has passed the gas-liquid separator 31.

Accordingly, the heat-exchanger 13 may evaporate the refrigerant through heat-exchange with the coolant.

That is, the gas-liquid separator 31 of the gas injection device 30 may bypass the gaseous refrigerant to the compressor 19 through the supply line 32, and may supply the liquid refrigerant to the fourth expansion valve 35.

Then, the refrigerant may be expanded while passing through the fourth expansion valve 35, and may be evaporated through heat-exchange with the coolant in the heat-exchanger 13.

In addition, some of the refrigerant expanded while passing through the fourth expansion valve 35 is supplied to the evaporator 16 along the dehumidification line 51.

That is, the external air introducing into the HVAC module 12 is dehumidified while passing through the evaporator 16 by the low-temperature refrigerant introducing into the evaporator 16. Then, while passing through the internal condenser 12a, it is converted into a high temperature state to introduce into the interior of the vehicle, thereby heating and dehumidifying the interior of the vehicle.

Accordingly, as described above, when the heat pump system for the vehicle according to the embodiment of the present disclosure is applied, simplification of the system may be realized, by using one chiller 40 in which a refrigerant and a coolant are heat-exchanged to control a temperature of a battery module according to a vehicle mode.

In addition, according to the embodiment of the present disclosure, by efficiently controlling a temperature of a battery module, it is possible to operate the battery module at optimal performance, and a total mileage of the vehicle may be increased through efficient management of the battery module.

In addition, according to the embodiment of the present disclosure, it is possible to maximize heating performance by selectively increasing a flow rate of refrigerant in the heating or dehumidifying mode of the vehicle by applying the gas injection device 30.

Furthermore, the present disclosure may reduce the manufacturing cost and weight through simplification of the entire system, and may improve space utilization.

While this disclosure has been described in connection with what is presently considered to be practical exemplary embodiments, it is to be understood that the disclosure is not limited to the disclosed embodiments. On the contrary, it is intended to cover various modifications and equivalent arrangements included within the spirit and scope of the appended claims.

The invention claimed is:

1. A heat pump system for a vehicle, comprising:
    an air conditioner circulating a refrigerant through a refrigerant line;
    a coolant circulation apparatus circulating a coolant through a coolant line;
    a chiller connected to the coolant circulation apparatus through the coolant line, the chiller being connected to the refrigerant line through a refrigerant connection line, and the chiller configured to heat-exchange a selectively introduced coolant with a refrigerant supplied from the air conditioner to control a temperature of the coolant; and
    a gas injection device provided in the air conditioner and increasing a flow rate of the refrigerant circulating in the refrigerant line by bypassing a portion of the refrigerant passing through an internal condenser to a compressor,
    wherein a heat-exchanger provided in the air conditioner is connected to the coolant circulation apparatus through the coolant line so that the coolant is supplied from the coolant circulation apparatus.

2. The heat pump system for the vehicle of claim 1, wherein the air conditioner includes:
    an HVAC module including an evaporator connected thereto through the refrigerant line, and an opening and closing door that selectively flows an external air passing through the evaporator into the internal condenser according to cooling, heating, and dehumidifying modes of the vehicle;
    the heat-exchanger that heat-exchanges a refrigerant supplied through the refrigerant line with a coolant supplied from the coolant circulation apparatus;
    a compressor connected between the evaporator and the heat-exchanger through the refrigerant line;
    a sub-condenser provided in the refrigerant line the heat-exchanger and the evaporator;

a first expansion valve provided in the refrigerant line connecting the sub-condenser and the evaporator;

a second expansion valve provided in the refrigerant connection line;

an accumulator provided in the refrigerant line between the evaporator and the compressor;

a branch line having a first end connected to the refrigerant line between the heat-exchanger and the sub-condenser through a refrigerant valve and a second end connected to the accumulator; and a dehumidification line having a first end connected to the refrigerant line between the internal condenser and the heat-exchanger and a second end connected to the refrigerant line between the evaporator and the first expansion valve, and having a check valve.

3. The heat pump system for the vehicle of claim 2, wherein a first end of the refrigerant connection line is connected to the refrigerant line between the sub-condenser and the first expansion valve; and a second end of the refrigerant connection line is connected to the refrigerant line between the accumulator and the evaporator.

4. The heat pump system for the vehicle of claim 2, wherein the second expansion valve selectively expands the refrigerant that has passed through the sub-condenser according to a mode of the vehicle to introduce the refrigerant into the refrigerant connection line.

5. The heat pump system for the vehicle of claim 3, wherein the gas injection device includes:

a gas-liquid separator provided in the refrigerant line between the internal condenser and the heat exchanger, the gas-liquid separator being configured to separate and selectively discharge a gaseous refrigerant and a liquid refrigerant among the refrigerant that have passed through the internal condenser;

a supply line connecting the gas-liquid separator and the compressor, the supply line being configured to selectively supply the gaseous refrigerant from the gas-liquid separator to the compressor;

a control valve provided in the supply line;

a third expansion valve provided in the refrigerant line between the internal condenser and the gas-liquid separator; and a fourth expansion valve provided in the refrigerant line between the gas-liquid separator and the heat-exchanger.

6. The heat pump system for the vehicle of claim 5, wherein when the gas injection device is operated in a heating mode of vehicle, the third expansion valve expands the refrigerant supplied from the internal condenser to supply the refrigerant to the gas-liquid separator; and the fourth expansion valve expands the refrigerant supplied from the gas-liquid separator to supply the refrigerant to the heat-exchanger.

7. The heat pump system for the vehicle of claim 5, wherein when the gas injection device is not operated in a heating mode of the vehicle, the third expansion valve passes the refrigerant supplied from the internal condenser; and the fourth expansion valve expands the refrigerant that has passed through the gas-liquid separator to supply the refrigerant to the heat-exchanger.

8. The heat pump system for the vehicle of claim 5, wherein when the gas injection device is not operated in a dehumidifying mode of the vehicle, the third expansion valve passes the refrigerant supplied from the internal condenser; and the fourth expansion valve expands the refrigerant that has passed through the gas-liquid separator to supply the refrigerant to the heat-exchanger.

9. The heat pump system for the vehicle of claim 5, wherein when the gas injection part is operated in a dehumidifying mode of the vehicle, the third expansion valve expands the refrigerant supplied from the internal condenser to supply the refrigerant to the gas-liquid separator; and the fourth expansion valve expands the refrigerant that has passed through the gas-liquid separator to supply the refrigerant to the heat-exchanger.

10. The heat pump system for the vehicle of claim 5, wherein in a cooling mode the vehicle, the third and fourth expansion valves do not expand the refrigerant supplied from the internal condenser, but flow the refrigerant through the refrigerant line.

11. The heat pump system for the vehicle of claim 5, wherein the control valve, when the gas injection device is operated, operates so that the supply line is opened.

12. The heat pump system for the vehicle of claim 5, wherein the second, third, and fourth expansion valves are electronic expansion valves that selectively expand the refrigerant while controlling flowing of the refrigerant.

13. The heat pump system for the vehicle of claim 5, wherein the heat-exchanger additionally condenses or evaporates the refrigerant discharged from the gas-liquid separator through heat-exchange with the coolant, according to a selective operation of the fourth expansion valve.

14. The heat pump system for the vehicle of claim 5, wherein when a battery module is cooled in a cooling mode of the vehicle:

the coolant circulation apparatus supplies a coolant to the heat-exchanger and the chiller through the coolant line connected to the heat-exchanger and the chiller;

in the air conditioner, the refrigerant connection line is opened by the second expansion valve;

the refrigerant is circulated along the refrigerant line and the refrigerant connection line;

the first and second expansion valves expand the refrigerant so that an expanded refrigerant is supplied to the evaporator and the chiller, respectively;

the branch line is closed by the refrigerant valve;

the refrigerant line connecting the heat-exchanger and the sub-condenser is opened by the refrigerant valve;

the heat-exchanger condenses the refrigerant through heat-exchange with the coolant; and the sub-condenser further condenses the refrigerant through heat-exchange with external air.

15. The heat pump system for the vehicle of claim 5, wherein in a heating mode of the vehicle:

the coolant circulation apparatus supplies the coolant to the heat-exchanger through the coolant line connected to the heat-exchanger;

in the air conditioner, the refrigerant line connecting the sub-condenser and the evaporator is closed by the first expansion valve;

the refrigerant connection line is closed by the second expansion valve;

the fourth expansion valve expands the refrigerant;

the branch line is opened by the refrigerant valve;

the refrigerant line connecting the heat-exchanger and the sub-condenser is closed by the refrigerant valve;

the heat-exchanger evaporates the refrigerant through heat-exchange with the coolant; and the gas injection device is selectively operated.

16. The heat pump system for the vehicle of claim 5, wherein in a dehumidifying mode of the vehicle:
the coolant circulation apparatus supplies the coolant to the heat-exchanger through the coolant line connected to the heat-exchanger;
in the air conditioner, the refrigerant line connecting the sub-condenser and the evaporator is closed by the first expansion valve;
the refrigerant connection line is closed by the second expansion valve;
the branch line is opened by the refrigerant valve;
the refrigerant line connecting the heat-exchanger and the sub-condenser is closed by the refrigerant valve;
the heat-exchanger evaporates the refrigerant through heat-exchange with the coolant;
the fourth expansion valve expands the refrigerant;
the dehumidification line is opened by the check valve so that the refrigerant expanded through the operation of the fourth expansion is supplied to the evaporator; and
the gas injection device is selectively operated.

17. The heat pump system for the vehicle of claim 2, wherein the gas injection device includes:
a plate-shaped heat-exchanger provided in the refrigerant line between the heat-exchanger and the sub-condenser;
a supply line that includes a first end connected to the refrigerant line between the heat-exchanger and the plate-shaped heat-exchanger and a second end connected to the compressor through the plate-shaped heat-exchanger;
a third expansion valve provided in the supply line at a front end of the plate-shaped heat-exchanger; and
a fourth expansion valve provided in the refrigerant line between the plate-shaped heat-exchanger and the sub-condenser.

18. The heat pump system for the vehicle of claim 2, wherein the heat-exchanger is a water-cooled heat-exchanger; and
the sub-condenser is an air-cooled heat-exchanger.

19. The heat pump system for the vehicle of claim 1, wherein the gas injection device selectively operates in a heating or dehumidifying mode of the vehicle.

* * * * *